US012023710B2

(12) United States Patent
Omary et al.

(10) Patent No.: US 12,023,710 B2
(45) Date of Patent: Jul. 2, 2024

(54) FLUORINATED POLYMERS FOR CORROSION PROTECTION OF METAL

(71) Applicant: University of North Texas, Denton, TX (US)

(72) Inventors: Mohammad A. Omary, Denton, TX (US); Teresa D. Golden, Denton, TX (US); Sreekar B. Marpu, Denton, TX (US); Waleed K. Yaseen, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 174 days.

(21) Appl. No.: 17/343,466

(22) Filed: Jun. 9, 2021

(65) Prior Publication Data

US 2021/0379621 A1 Dec. 9, 2021

Related U.S. Application Data

(60) Provisional application No. 63/036,502, filed on Jun. 9, 2020.

(51) Int. Cl.
*B05D 3/06* (2006.01)
*B05D 3/14* (2006.01)
(Continued)

(52) U.S. Cl.
CPC ............. *B05D 3/067* (2013.01); *B05D 3/142* (2013.01); *B05D 7/14* (2013.01); *C08F 220/24* (2013.01);
(Continued)

(58) Field of Classification Search
CPC combination set(s) only.
See application file for complete search history.

(56) References Cited

U.S. PATENT DOCUMENTS 3,458,348 A * 7/1969 Sherman .................... C08J 7/16
427/164
9,481,769 B2 11/2016 Bish et al.
(Continued)

FOREIGN PATENT DOCUMENTS

CN 112079957 A * 12/2020 ............ C08F 220/24
GB 2059982 A * 4/1981 ............. G03F 7/027
(Continued)

OTHER PUBLICATIONS

Kerry, 9—Aluminum foil packaging, Editor(s): Anne Emblem, Henry Emblem, Packaging Technology, Woodhead Publishing, 2012, pp. 163-177, ISBN 9781845696658, https://doi.org/10.1533/9780857095701.2.163. (https://www.sciencedirect.com/science/article/pii/B9781845696658500093) (Year: 2012).*
(Continued)

*Primary Examiner* — Nicole M. Buie-Hatcher
(74) *Attorney, Agent, or Firm* — Haukaas Fortius PLLC; Michael Haukaas (57) ABSTRACT

The hydrophobic and corrosion resistive film of cross-linked poly(hexafluoroisopropyl methacrylate) was prepared by photopolymerization. The starting materials were a monomer of 1,1,1,3,3,3-hexafluoroisopropyl methacrylate, a photoinitiator of hydroxycyclohexyl phenyl ketone, and a cross-linker of poly(ethyleneglycol) diacrylate). Photopolymerization was used to start polymerization and to cure the polymer film on an aluminum surface. Drop-casting was used to deposit the fluoropolymer onto an aluminum substrate (AA 3003). The fluoropolymer film has high corrosion protection when measured by potentiodynamic polarization and open circuit potential techniques in an aqueous solution of 3.5% NaCl. Fourier-transform infrared spectroscopy was used to monitor the polymerization process. The dynamic contact angle technique was used to measure the hydrophobicity for the fluorinated polymer
(Continued)

coating. Thermal stability of the fluorinated polymer was measured using thermogravimetric analysis. Treatment with strong acid followed by contact angle measurements before and after the treatment confirmed the chemical resistance for the coated aluminum.

15 Claims, 5 Drawing Sheets (51) Int. Cl.
B05D 7/14 (2006.01)
C08F 220/24 (2006.01)
C09D 5/08 (2006.01)
C09D 133/16 (2006.01)
C09D 171/02 (2006.01)
C22C 21/00 (2006.01)
C23F 1/36 (2006.01)

(52) U.S. Cl.
CPC ........... C09D 5/082 (2013.01); C09D 133/16 (2013.01); C09D 171/02 (2013.01); C22C 21/00 (2013.01); C23F 1/36 (2013.01); B05D 2202/25 (2013.01); B05D 2502/00 (2013.01)

(56) References Cited

U.S. PATENT DOCUMENTS

| | | | |
|---|---|---|---|
| 9,567,419 | B2 | 2/2017 | Bish et al. |
| 2003/0207202 | A1* | 11/2003 | Fujita ............... G03F 7/038 526/248 |
| 2004/0167257 | A1 | 8/2004 | Ryang |
| 2006/0189113 | A1 | 8/2006 | Vanheusden et al. |
| 2006/0199886 | A1 | 9/2006 | Ryang |
| 2010/0076168 | A1* | 3/2010 | Hara ................... C09D 133/16 526/245 |
| 2011/0142899 | A1 | 6/2011 | Abello et al. |
| 2011/0159175 | A1 | 6/2011 | Groh et al. |
| 2012/0094020 | A1 | 4/2012 | Schlenoff |
| 2012/0214923 | A1 | 8/2012 | Chakraborty et al. |
| 2014/0187413 | A1 | 7/2014 | Cabello et al. |
| 2015/0354072 | A1 | 12/2015 | Suchsland et al. |
| 2018/0273774 | A1 | 9/2018 | Brown et al. |
| 2019/0040270 | A1 | 2/2019 | Brown et al. |
| 2019/0100440 | A1 | 4/2019 | Sohail et al. |
| 2019/0330757 | A1 | 10/2019 | Golden et al. |

FOREIGN PATENT DOCUMENTS

| | | | |
|---|---|---|---|
| JP | 09003358 | A * | 1/1997 |
| JP | 2006274385 | A | 10/2006 |
| WO | 2014081798 | A1 | 5/2014 |

OTHER PUBLICATIONS

Machine translation of CN 112079957 A, retrieved Jun. 2023 (Year: 2023).*

Machine translation of JP 09003358 A, retrieved Jun. 2023 (Year: 2023).*

Ahmad et al., "Salt Water Corrosion Resistance of Electrodeposited Ni-Layered Silicate Nanocomposite Coatings from Watts' Type Solution," Surf Coat Tech., 242:170-176, Mar. 2014.

Conrad et al., "Improved Corrosion Resistant Properties of Electrochemically Deposited Zinc-Nickel Alloys Utilizing a Borate Electrolytic Alkaline Solution," Surf Coat Tech., 272:50-57, Jun. 2015.

Daugherty et al., "Design Challenges in Electrodepositing Metal-Anionic Clay Nanocomposites: Synthesis, Characterization, and Corrosion Resistance of Nickel-LDH Nanocomposite Coatings," Surf Coat Tech., 349:773-782, Sep. 2018.

Daugherty et al., "The Influence of an Aqueous-Butanol Plating Bath on the Microstructure and Corrosion Resistance of Electrodeposited Nickel Coatings," J Appl Electrochem., 47(4):467-477, Apr. 2017.

Grignard et al., "Electrospinning of a Functional Perfluorinated Block Copolymer as a Powerful Route for Imparting Superhydrophobicity and Corrosion Resistance to Aluminum Substrates," Langmuir, 27(1):335-342, Jan. 2011.

Malshe et al., "Fluorinated Acrylic Copolymers Part I: Study of Clear Coatings," Prog Org Coat., 53(3):207-211, Jul. 2005.

Roche et al., "Corrosion Performance of Lamellae Nanostructured Fluorinated Organic Coating Applied on Steel," J Electroceram., 16:41-47, Feb. 2006.

Tientong et al., "Influence of Bath Composition at Acidic pH on Electrodeposition of Nickel-Layered Silicate Nanocomposites for Corrosion Protection," Int J Electrochem., 2013:1-8, Nov. 2013.

Wang et al., "Polymeric Organo-Silane Coatings for Aluminum Alloy Corrosion Protection by Self-Assembled Method," J Chem., 9(1):435-442, 2012.

Yao et al., "Fluorinated poly(meth)acrylate: Synthesis and Properties," Polymer, 55(24):6197-6211, Nov. 2014.

Zheng et al., "Development of Stable Superhydrophobic Coatings on Aluminum Surface for Corrosion-Resistant, Self-Cleaning, and Anti-Icing Applications," Mater Design, 93:261-270, Mar. 2016.

* cited by examiner

FLUORINATED POLYMERS FOR CORROSION PROTECTION OF METAL

RELATED APPLICATIONS

This application claims priority under 35 U.S.C. § 119(e) to U.S. Provisional Patent Application No. 63/036,502, filed Jun. 9, 2020, which is incorporated herein by reference.

BACKGROUND OF THE INVENTION

Research and investigation of potential applications of fluorinated polymers has increased due to the unique and interesting properties of polymers containing fluorine atoms. Good thermal stability of the fluorinated polymers comes from the strong C—F bond. Other excellent properties for these polymers include hydrophobicity, chemical and weather resistance, low surface energy, and high insulation. Wettability and hydrophobicity are characteristics that can be varied by changing the composition and structure of the polymer. Yao et al. (Polymer 55.24 (2014): 6197) reported that, since fluorinated functional groups have lower surface energy than the polymer backbone functional groups (mostly carbon chains), fluorinated groups segregate to the surface in order to reduce the overall surface energy— creating a more hydrophobic surface. Dynamic contact angle is a quantitative method that shows the increase in hydrophobicity and the decrease in the wettability when organic coatings include fluorinated groups.

An expensive failure in many industries is metal corrosion. For example, millions of tons of steel are produced annually. It is estimated that corrosion degrades about 30% of that steel. In fact, the corrosion in metals is responsible for hundreds of billions of dollars of loss in the US annually. Aluminum and steel are the most common metals used in industry; and are used in many places such as pipelines, refining and petroleum production equipment, and fossil fuel power plants, yet these metals can exhibit low corrosion resistance when exposed to oxygen, water, and/or salts. To avoid this degradation, aluminum or steel surfaces must be coated and protected by materials that exhibit high corrosion resistance. Consequently, research is constantly progressing in this area. One useful technique used for corrosion protection is adding an organic coating to impede contact between the metal surface and corrosive environment. Fluorinated polymers are examples of hydrophobic materials that have been successfully used for corrosion protection, due to their ability to repel water from the surface. Yet the synthetic processes of these fluorinated polymers require some high-cost conditions such as a cooling system, high pressure, and high temperature—which increase the synthetic cost. Zheng et al. (Materials & Design, 2016, 93, 261) developed a superhydrophobic coating on aluminum. They reported that, after aluminum was coated, a reduction in the corrosion current density ($i_{corr}$) by two-orders of magnitude was achieved.

Accordingly, practical and cost-effective coatings and methods are needed to inhibit corrosion of metals.

SUMMARY

This disclosure provides the preparation of a crosslinked fluoropolymer, such as, poly(hexafluoroisopropyl methacrylate) (i.e., PHFiPMA) from inexpensive and commercially-available materials and by using an easy photopolymerization method. The prepared polymer was applied on the aluminum alloy (3003) surface by using one of the simplest coating techniques, the drop-casting method. Photoinitiated free-radical polymerization was also used due to its faster reaction time and easier manufacturing method. Reduction in the corrosion current density ($i_{corr}$) by about four-orders of magnitude was achieved with our coatings in this study. The result is a hydrophobic, corrosion protective, chemical resistive, thermally stable, and strongly adherent fluorinated polymer coating to the aluminum surface.

Accordingly, this disclosure provides a corrosion resistant composition comprising a crosslinked halo-polymer of Formula X:

wherein
$R^1$ and $R^2$ are terminal ends of the polymer;
$R^3$ and $R^4$ are branched or unbranched —($C_1$-$C_6$)haloalkyl;
$R^5$ and $R^6$ are branched or unbranched —($C_1$-$C_6$)alkyl; and
m, n, and p are each independently at least 10;
wherein the ratio of the haloalkyl-monomer moiety and polyethyleneglycol-monomer (PEG-monomer) moiety is about 8:1 to about 10:1, and the crosslinked haloalkyl-polymer is bonded to the surface of an etched metal.

This disclosure also provides a method for forming a corrosion resistant composition comprising:
a) mixing a polyfluorinated monomer, polyethyleneglycol-based crosslinker, and photoinitiator, wherein the mole ratio of the monomer and crosslinker is about 8:1 to about 10:1;
b) irradiating the mixture with a sufficient amount of UV light to form a gel;
c) applying the gel to the surface of an etched metal substrate; and
d) irradiating the applied gel with another sufficient amount of UV light to cure the gel wherein in the cured gel is a solidified crosslinked fluoropolymer that has bonded to the etched metal substrate;
wherein the corrosion resistant composition is thereby formed.

The invention provides novel polymers of Formula X, Formula I and Formula II, intermediates for the synthesis of polymers of Formula X, Formula I and Formula II, as well as methods of preparing polymers of Formula X, Formula I and II. The invention also provides polymers of Formula X, Formula I and II that are useful as intermediates for the synthesis of other useful polymers. The invention provides for the use of compounds of Formula X, Formula I and Formula II for the manufacture of corrosion resistant substrates, such as metals.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Interesting properties of fluorinated polymers have attracted scientists and researchers to investigate potential applications of these polymers. Using fluorinated polymers as materials for nanoscale devices, batteries, and biocompatible materials are some applications due to the excellent properties of fluorinated polymers. These properties come from unique characteristics of fluorine atom. Small size, high electronegativity, and low polarizability are some of these characters. Due to its small size, fluorine atom has a high degree of overlap between its outer orbitals and carbon atom orbitals making C—F bond very strong and leading to high thermal stability for fluorinated polymers. Insulation, weather and chemical resistance, hydrophobicity, low surface energy, optical activity, and high dielectric constant are excellent properties for fluorinated polymers that contain C—F bond.

Some of the material properties depend on the structure and chemical composition of the outermost surface layer. Examples for these properties are hydrophobicity and wettability. If there are some functional groups which have lower surface energy than the backbone of the polymer, these functional groups will segregate to the outer surface in order to minimize the overall surface energy. Fluorinated groups have lower surface energy than the polymer backbone which reduce the surface energy for the outer layer making the surface more hydrophobic; and that it can be shown by increasing the contact angle which is a quantitative test for the wettability of surfaces by liquids. Free-radical photopolymerization, which was used in this study, is a common method for cross-linked polymer synthesis due to its advantages such as faster reaction time and easier manufacturing techniques. Hydrophobicity, inexpensive, and easy to apply are the characteristics that make fluorinated polymers good candidates for corrosion protection applications.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

Wherever the term "comprising" is used herein, options are contemplated wherein the terms "consisting of" or "consisting essentially of" are used instead. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the aspect element. As used herein, "consisting essentially of" does not exclude materials or steps that do not materially affect the basic and novel characteristics of the aspect. In each instance herein any of the terms "comprising", "consisting essentially of" and "consisting of" may be replaced with either of the other two terms. The disclosure illustratively described herein may be suitably practiced in the absence of any element or elements, limitation or limitations which is not specifically disclosed herein.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983); for heterocyclic synthesis see Hermanson, Greg T., Bioconjugate Techniques, Third Edition, Academic Press, 2013.

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms.

An alkylene is an alkyl group having two free valences at a carbon atom or two different carbon atoms of a carbon chain. Similarly, alkenylene and alkynylene are respectively an alkene and an alkyne having two free valences at two different carbon atoms.

As used herein, the term "substituted" or "substituent" is intended to indicate that one or more (for example, in various embodiments, 1-10; in other embodiments, 1-6; in some embodiments 1, 2, 3, 4, or 5; in certain embodiments, 1, 2, or 3; and in other embodiments, 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Solvents may be used alone or two or more of them may be mixed for use to provide a "solvent system".

Substituents of the compounds and polymers described herein may be present to a recursive degree. In this context, "recursive substituent" means that a substituent may recite another instance of itself. Because of the recursive nature of such substituents, theoretically, a large number may be present in any given claim. One of ordinary skill in the art of organic chemistry understands that the total number of such substituents is reasonably limited by the desired properties of the compound intended. Such properties include, by of example and not limitation, physical properties such as molecular weight, solubility or log P, application properties such as activity against the intended target, and practical properties such as ease of synthesis. Recursive substituents are an intended aspect of the invention. One of ordinary skill in the art of organic chemistry understands the versatility of such substituents. To the degree that recursive substituents are present in a claim of the invention, the total number in the repeating unit of a polymer example can be, for example, about 1-50, about 1-40, about 1-30, about 1-20, about 1-10, or about 1-5.

The term, "repeat unit", "repeating unit", or "block" as used herein refers to the moiety of a polymer that is repetitive. The repeat unit may comprise one or more repeat units, labeled as, for example, repeat unit A, repeat unit B, repeat unit C, etc. Repeat units A-C, for example, may be covalently bound together to form a combined repeat unit. Monomers or a combination of one or more different monomers can be combined to form a (combined) repeat unit of a polymer or copolymer.

The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

In various embodiments, the ends of the copolymer (i.e., the initiator end or terminal end), is a low molecular weight moiety (e.g. under 500 Da), such as, H, OH, OOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

Embodiments of the Invention

This disclosure provides a corrosion resistant composition comprising (or that is) a crosslinked poly(hexafluoroalkyl methacrylate) bonded to the surface of an etched metal.

Also, this disclosure provides a corrosion resistant composition comprising (or that is) a crosslinked haloalkyl-polymer of Formula X:

(X)

wherein
$R^1$ and $R^2$ are terminal ends of the polymer;
$R^3$ and $R^4$ are branched or unbranched —($C_1$-$C_6$)haloalkyl;
$R^5$ and $R^6$ are each independently branched or unbranched —($C_1$-$C_6$)alkyl, branched or unbranched —($C_1$-$C_6$) haloalkyl, or halo; and
m, n, and p are each independently at least 10;
wherein the ratio of the haloalkyl-monomer moiety and polyethyleneglycol-monomer (PEG-monomer) moiety is about 8:1 to about 10:1, and the crosslinked haloalkyl-polymer is bonded to the surface of an etched metal.

In some embodiments, the hexafluoroalkyl methacrylate monomer moiety of the crosslinked poly(hexafluoroalkyl methacrylate) is 1,1,1,3,3,3-hexafluoroisopropyl methacrylate (HFiPMA) or 2,2,3,4,4,4-hexafluorobutyl methacrylate (HFBMA). In other embodiments, the haloalkyl-monomer moiety is 1,1,1,3,3,3-hexafluoroisopropyl methacrylate (HFiPMA) or 2,2,3,4,4,4-hexafluorobutyl methacrylate (HFBMA).

In other embodiments, the crosslinked monomer moiety of the crosslinked poly(hexafluoroalkyl methacrylate) is poly(ethyleneglycol diacrylate). In yet other embodiments, the PEG-monomer moiety is poly(ethyleneglycol diacrylate). In other embodiments, n is about 10,000 to about 100,000.

In additional embodiments, $R^3$ and $R^4$ are branch or unbranched —$(C_1$-$C_6)$fluoroalkyl wherein —$(C_1$-$C_6)$fluoroalkyl has at least three fluoro substituents. In other embodiments, $R^3$ and $R^4$ are each independently $CF_3$, $CH_2CF_3$, $CF_2CF_3$, $CH(CF_3)_2$, $CH_2CF_2CF_3$, $CH_2CF_2CF_2CF_3$, or $CH_2CF_2CHFCF_3$. In other embodiments, each $(C_1$-$C_6)$fluoroalkyl moiety is substituted with 1, 2, 3, 4, 5, 6, 7, 8, 9, 10, 11, 12, or more halo or fluoro substituents. In other embodiments, $R^5$ and $R^6$ are methyl. In other embodiments, $R^5$ and $R^6$ are each independently methyl, fluor, or trifluoromethyl. In some embodiments, m and p are each independently about 100 to about 100,000. In other embodiments, m and p are each independently about 10 to about 100, about 100 to about 200, about 100 to about 200, about 200 to about 300, about 200 to about 300, about 300 to about 450, about 450 to about 600, about 600 to about 800, about 800 to about 1000, about 1000 to about 1500, about 1500 to about 2000, about 2000 to about 3000, about 3000 to about 4000, about 4000 to about 6000, about 6000 to about 8000, about 8000 to about 10000, about 10000 to about 50000, about 50000 to about 75000, or about 75000 to about 100000.

In yet other embodiments, the etched metal is aluminum alloy or steel. In further embodiments, the etched metal is aluminum alloy 3003 having a weight percent of 1.5% magnesium, 0.7% iron, 0.6% silicon, 0.2% copper, 0.1% zinc, and 96.9% aluminum, wherein the weight percentages are about the recited values. In some other embodiments, etched metal is an alkaline base or plasma etched metal.

In additional embodiments, the crosslinked poly(hexafluoroalkyl methacrylate) or the crosslinked haloalkyl-polymer of Formula X is a crosslinked fluoropolymer of Formula I or Formula II:

wherein
$R^1$ and $R^2$ are terminal ends of the polymer; and
m, n, and p are each independently at least 10; and
the etched metal is an aluminum alloy.

In some embodiments, m, n, and p are each independently about 100 to about 100,000. In other embodiments, the values of m, n, and p are each independently about 100 to about 1000, about 1,000 to about 5,000, about 5,000 to about 10,000, about 10,000 to about 15,000, about 15,000 to about 20,000, about 20,000 to about 30,000, about 30,000 to about 40,000, about 40,000 to about 50,000, about 50,000 to about 60,000, about 60,000 to about 70,000, about 70,000 to about 80,000, about 80,000 to about 90,000, about 90,000 to about 100,000, about 100,000 to about 250,000, or about 250,000 to about 500,000.

In yet other embodiments, the monomer mole ratio of the hexafluoroalkyl methacrylate moiety and the poly(ethyleneglycol diacrylate) moiety is about 9:1, about 15:1, about 14:1, about 13:1, about 12:1, about 11:1, about 10:1, about 8:1, about 7:1, about 6:1, about 5:1, about 4:1, about 3:1, about 2:1, or about 1:1, wherein the weight percentages recited are approximate.

In other embodiments, the composition has a relative open circuit potential (OCP) value greater than or about equal to 0.3V higher than bare aluminum alloy after the composition and bare aluminum alloy have been immersed for 60 days in a 3.5 wt. % NaCl aqueous solution. In some other embodiments, said relative OCP value for the composition is about 1.0V higher, about 0.9V higher, about 0.8V higher, about 0.7V higher, about 0.6V higher, about 0.5V higher, about 0.4V higher, about 0.35V higher, about 0.2V higher, or about 0.1V higher than bare aluminum alloy.

Additionally, this disclosure provides a method for forming a corrosion resistant composition comprising:
a) mixing a polyfluorinated monomer, polyethyleneglycol-based crosslinker, and photoinitiator, wherein the mole ratio of the monomer and crosslinker is about 8:1 to about 10:1;
b) irradiating the mixture with a sufficient amount of UV light to form a gel;
c) applying the gel to the surface of an etched metal substrate; and
d) irradiating the applied gel with another sufficient amount of UV light to cure the gel wherein in the cured gel is a solidified crosslinked fluoropolymer that has bonded to the etched metal substrate;
wherein the corrosion resistant composition is thereby formed.

In various embodiments, the monomer is 1,1,1,3,3,3-hexafluoroisopropyl methacrylate (HFiPMA) or 2,2,3,4,4,4-hexafluorobutyl methacrylate (HFBMA). In additional embodiments, the crosslinker is poly(ethyleneglycol diacrylate). In other embodiments, the mole ratio of monomer and crosslinker is about 9:1, or otherwise described above.

In further embodiments, the etched metal substrate is aluminum alloy or steel. In some other embodiments, the etched metal substrate is aluminum alloy 3003 having a weight percent of 1.5% magnesium, 0.7% iron, 0.6% silicon, 0.2% copper, 0.1% zinc, and 96.9% aluminum, wherein the recited weight percentages are approximate values. In some embodiments, the photoinitiator is hydroxycyclohexyl phenyl ketone or the like.

In additional embodiments, the method further comprises etching a metal substrate with alkaline base or plasma to form the etched metal substrate wherein the etched metal substrate has an activated surface. In some embodiments, the activated metal surface is free of contaminants. In other embodiments the activated metal surface bonds to the crosslinked haloalkyl-polymer or fluoropolymer described herein by covalent bonding, ionic bonding, van der Waals bonding, or electrostatic bonding. In some embodiments the alkali base is LiOH, NaOH, or KOH. In other embodiments, the plasma is oxygen plasma, or argon plasma.

In yet other embodiments, the crosslinked fluoropolymer has a thickness of about 1 micrometer to about 100 micrometers. In further embodiments, the coating thickness of the fluoropolymer is about 2 micrometers to about 5 micrometers, about 5 micrometers to about 10 micrometers, about 10 micrometers to about 15 micrometers, about 15 micrometers to about 20 micrometers, about 20 micrometers to about 25 micrometers, about 25 micrometers to about 30 micrometers, about 30 micrometers to about 35 micrometers, about 35 micrometers to about 40 micrometers, about 40 micrometers to about 50 micrometers, about 50 micrometers to about 60 micrometers, about 60 micrometers to about 75 micrometers, or about 75 micrometers to about 100 micrometers.

In some other embodiments, the sufficient amount of UV light or the other sufficient amount of UV light is provided in about 1 minute to about 60 minutes, or about 1-120 minutes of time. In other embodiments the UV irradiation time for each dose of UV light is about 5 minutes, about 10 minutes, about 20 minutes, about 30 minutes, about 40 minutes, about 50 minutes, about 60 minutes, about 70 minutes, about 80 minutes, about 90 minutes, about 100 minutes, about 110 minutes, or about 180 minutes.

In various other embodiments, the crosslinked fluoropolymer is a crosslinked fluoropolymer of Formula I or Formula II:

wherein $R^1$ and $R^2$ are terminal ends of the polymer; and
m, n, and p are each independently at least 10; and
the etched metal substrate is aluminum alloy.

Results and Discussion

Figure 1:
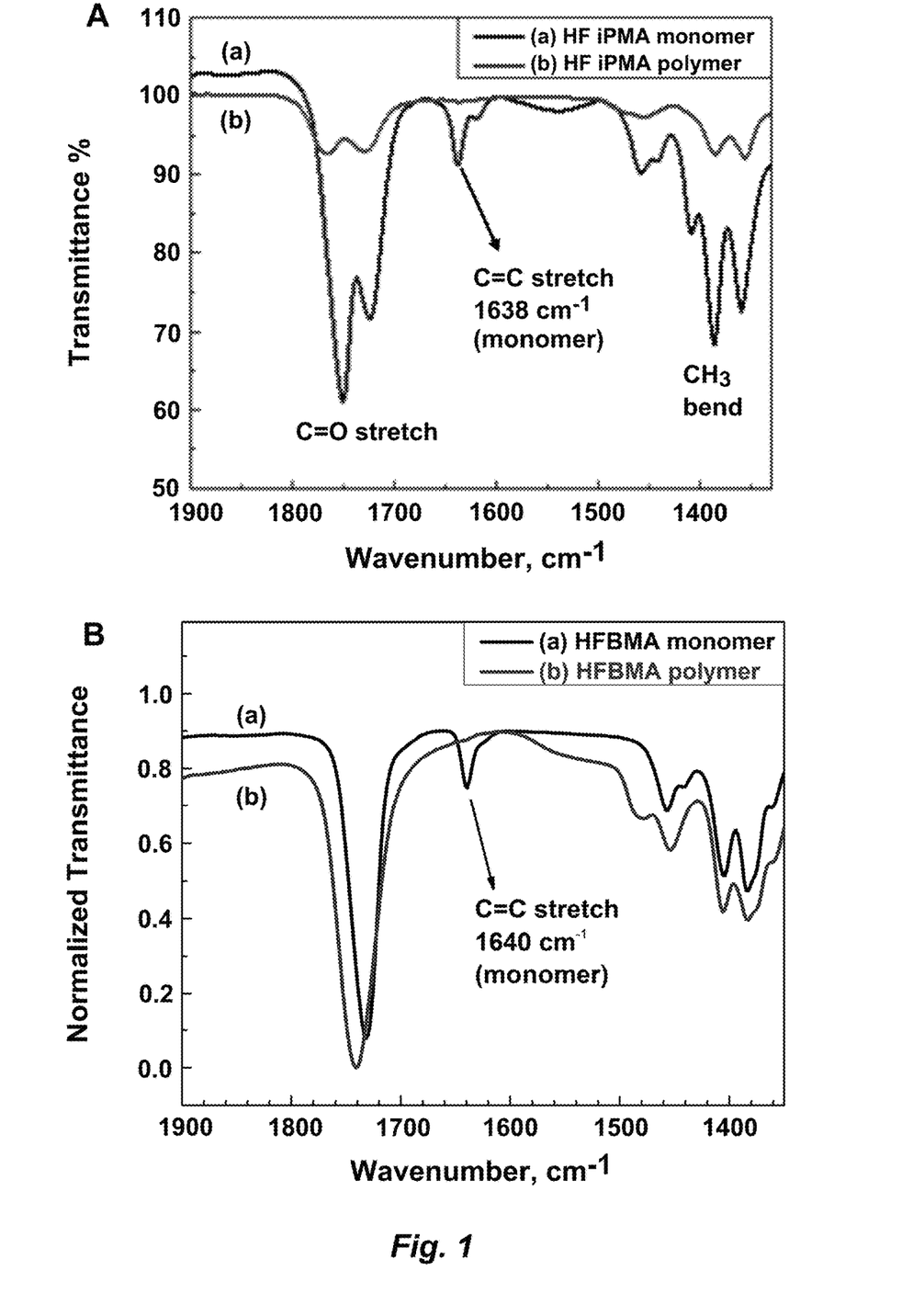
FIG. 1. A. FTIR spectra for (a) the monomer 1,1,1,3,3,3-hexafluoroisopropyl methacrylate and (b) the polymer thereof, i.e., PHFiPMA. B. FTIR spectra for the monomer and the crosslinked polymer of 2,2,2,3,4,4-hexafluorobutyl methacrylate.

Spectroscopic Characterization (FTIR). As the mechanism in Scheme 1 shows, as the polymerization progresses, the C=C bond in the monomer will disappear since the carbon atoms in the monomer bond to each other and to the crosslinker making the polymer backbone. FIG. 1A shows the FTIR spectrum for 1,1,1,3,3,3-hexafloroisopropyl methacrylate monomer and the polymer thereof, i.e., PHFiPMA. The disappearance of the C=C stretching peak at about 1638 cm$^{-1}$ (1640 cm$^{-1}$ in FIG. 1B) indicates bonding between the double bonds of the monomers to make an unsaturated polymer backbone.

Figure 2:
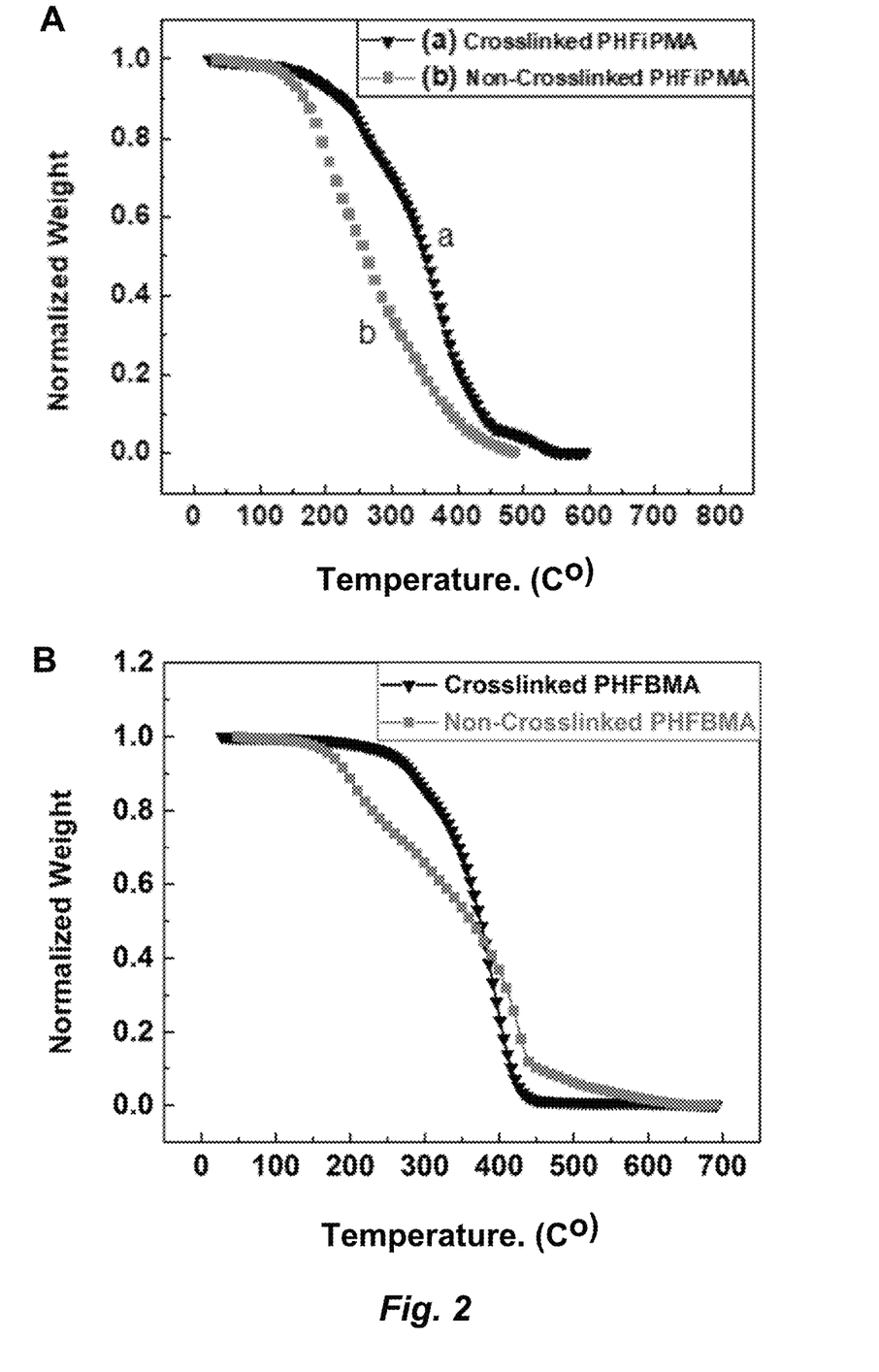
FIG. 2. A. TGA for (a) crosslinked and (b) non-crosslinked PHFiPMA. B. TGA for crosslinked and non-crosslinked poly hexafluorobutyl methacrylate (PHFBMA).

Thermogravimetric Analysis (TGA). These polymers show high thermal stability, because of the strong bond between fluorine and carbon atoms in the fluorinated polymers. This can be seen in FIG. 2A for the crosslinked and non-crosslinked PHFiPMA. The non-crosslinked polymer decomposes in a temperature range of 150-400° C. Hardening (crosslinking process) enhances the thermal stability as seen from the TGA data of the crosslinked polymer which decomposes in a range of 200-400° C.

FIG. 2B shows the non-crosslinked fluorinated polymer is thermally stable at a temperature up to 172° C.; and it decomposes in the range of 172-440° C. Crosslinking with PEG Diacrylate enhanced the thermal stability for this polymer. The decomposition for the crosslinked polymer was in a temperature range of 260-440° C. The thermal stability for these polymers is due to the strong and stable bond of C—F.

Figure 3:
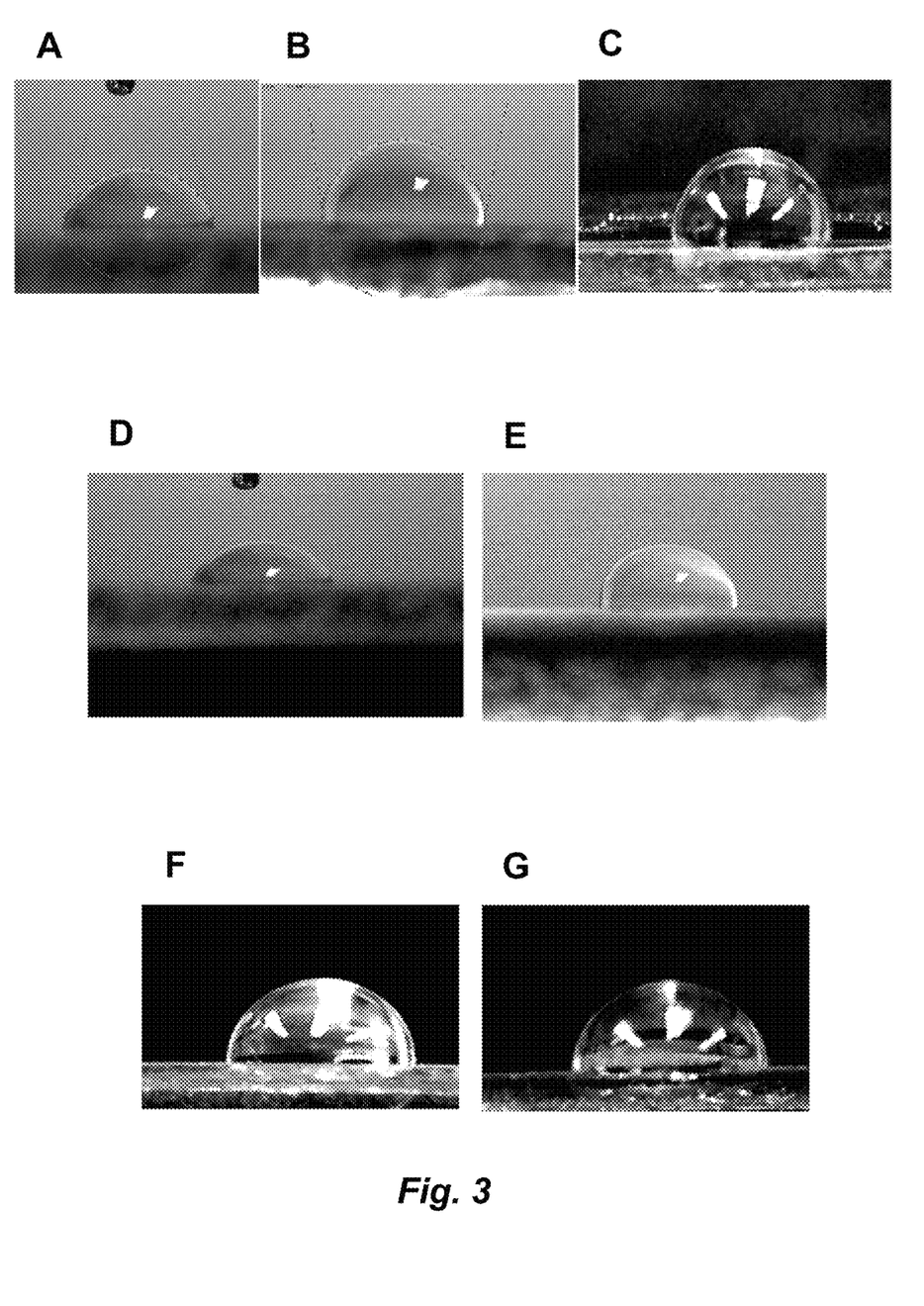
FIG. 3. Contact angle (A) for uncoated aluminum, (B) for aluminum coated by PHFiPMA film, and (C) for PHFiPMA film after immersing in 5% $H_2SO_4$ for 24 hours. Contact angle for uncoated aluminum (D). Contact angle for aluminum coated by crosslinked PHFBMA Film (E). Contact angle for crosslinked PHFBMA Film after immersing into 5% $H_2SO_4$ (F). Contact angle for PHFBMA Film after immersing into 5% NaOH (G).

Contact Angle and Chemical Resistance. Dynamic contact angle between a water droplet and the solid surface is a quantitative approach for measuring the hydrophobicity of surfaces. Fluorinated polymers show low wettability and high hydrophobicity due to the low surface energy for these types of polymers. PHFiPMA has six fluorine atoms in each unit cell, as represented in Scheme 1. Fluorine atoms have low surface energy that reduce the contact area between the solid surface and the liquid. Therefore, the hydrophobicity represented by the contact angle for this polymer is high, as shown in FIGS. 3A and 3B for the uncoated aluminum & aluminum coated by PHFiPMA film, respectively.

The surface of the bare aluminum has a low hydrophobicity (high wettability) with a contact angle of 65°±3. The surface of the PHFiPMA film has a high hydrophobicity with a contact angle of 100°±3. This result indicates that the fluorinated film minimizes the contact area between the solution and the solid surface of the metal which is the main factor in the corrosion process. In order to determine the chemical resistance and to prove that PHFiPMA film is stable in harsh and aggressive environment, this film sample was immersed into 5% $H_2SO_4$ solution at room temperature for 24 hours then washed by deionized water. The contact angle was determined after immersing. FIG. 3C shows the contact angle for PHFiPMA film after immersing into $H_2SO_4$ as 98°±3. The film hydrophobicity did not significantly change by immersing in a harsh solution. Commonly used solvents such as methanol, ethanol, chloroform, acetone, THF, and acetonitrile were used to determine the solubility of PHFiPMA. None of these solvents dissolved the PHFiPMA polymer. The solubility results and the stability in the hydrophobicity of the PHFiPMA confirm the chemical resistance for this fluorinated polymer.

FIGS. 3D and 3E shows that water droplet contact angle on aluminum surface and on the fluorinated polymer film. The contact angle on aluminum surface is 65°±3 degree; and on fluorinated polymer film is as high as 110°±3 degree. Enhancing in the hydrophobicity comes from the fact that low surface energy atoms such as fluorine minimize the contact area between the polymer surface and the liquid which reduce the wettability of these coating surfaces.

The contact angle was examined after the crosslinked PHFBMA Film was immersed in 5% $H_2SO_4$ solution for 24 hours at room temperature. The contact angle was examined again after immersing the film in 5% NaOH solution in the same conditions. FIGS. 3F and 3G shows the contact angle after immersing in $H_2SO_4$ and NaOH.

The contact angle for crosslinked PHFBMA film is 105°±3 after immersing in $H_2SO_4$ solution; and it is 105°±3 after immersing in NaOH solution indicating that the film structure did not significantly affected by immersing into strong acids and bases. Common organic and inorganic solvents were used to determine the solubility for the crosslinked PHFBMA such as acetone, acetonitrile, methanol, ethanol, chloroform, DMSO, and THF. None of these solvents was able to dissolve this polymer. These results indicate the chemical and solvents resistance for this crosslinked polymer.

Figure 4:
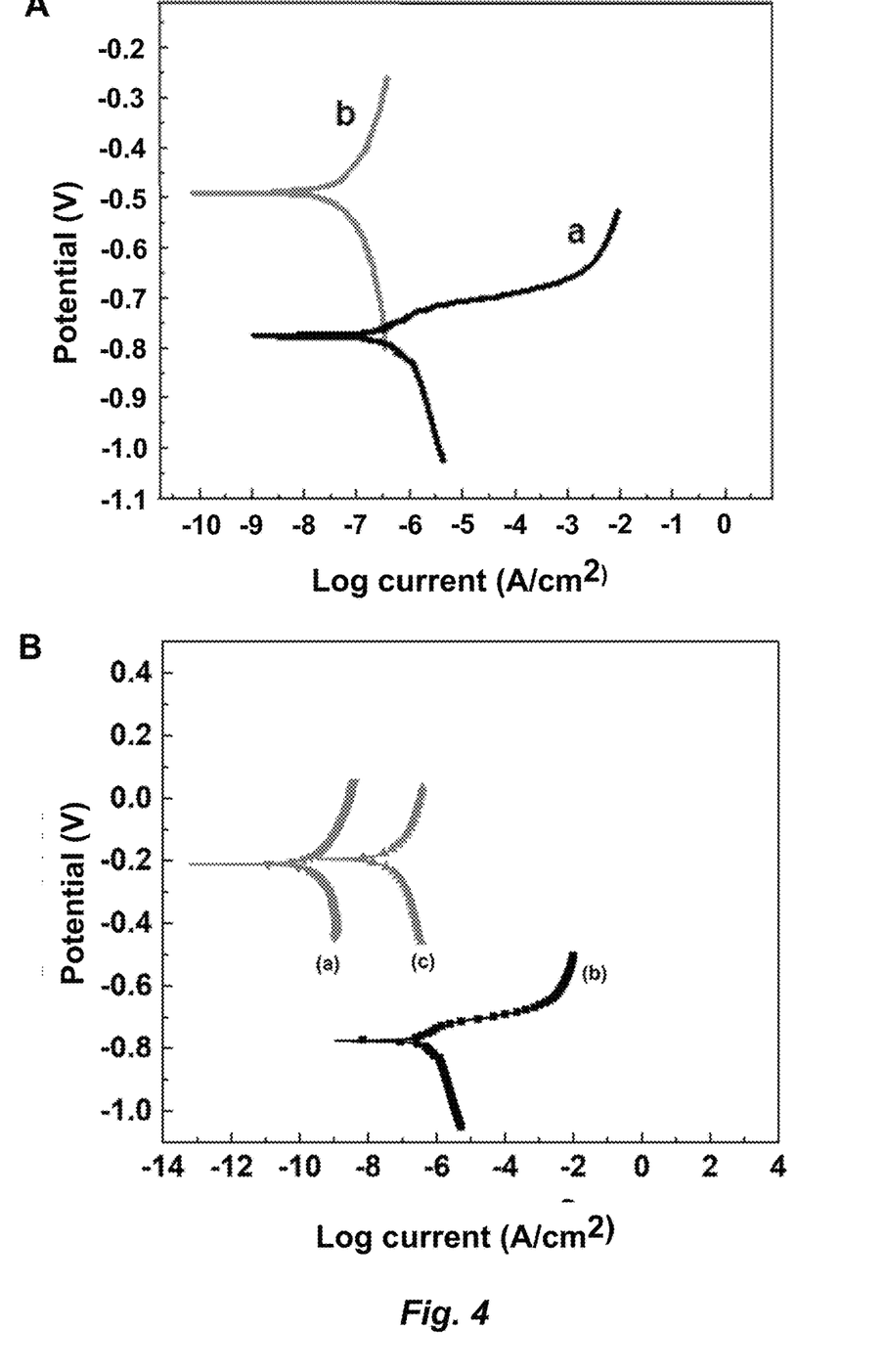
FIG. 4. A. Potentiodynamic polarization for (a) uncoated aluminum and (b) aluminum coated with PHFiPMA film. B. Potentiodynamic polarization for uncoated aluminum and aluminum coated by crosslinked and non-crosslinked PHFBMA Films; (a) crosslinked PHFBMA film on aluminum; (b) uncoated aluminum; (c) non-crosslinked PHFBMA film on aluminum.

Corrosion Protection Properties of the Fluorinated Polymer Coating. FIG. 4A shows the potentiodynamic polarization runs for the bare aluminum (uncoated aluminum) and aluminum coated with PHFiPMA.

The corrosion current density ($i_{corr}$) decreased and the corrosion potential ($E_{corr}$) increased (positive shift) when the aluminum surface was coated with PHFiPMAfFilm. The $i_{corr}$ decreased to ~3.47×10$^{-6}$ µA/cm$^2$ for the aluminum coated with PHFiPMA film compared to 2.50×10$^{-2}$ µA/cm$^2$ for uncoated aluminum. $E_{corr}$ had a positive (cathodic) shift from −0.77 V versus SCE for uncoated aluminum to ~−0.51 V versus SCE for aluminum coated with PHFiPMA film. Polarization resistance ($R_p$), which represents the polymer film resistance against the current flow, increased to 2.42× 10$^7$ ohms/cm$^2$ for aluminum coated by PHFiPMA film compared to an $R_p$ of 1.80×10$^3$ ohms/cm$^2$ for uncoated aluminum. Table 1 lists the electrochemical parameters for the bare aluminum and the mean and standard deviation values for three replicate samples of aluminum coated with PHFiPMA films.

The corrosion potential for PHFBMA film has positive shift and the corrosion current decrease compared to the uncoated aluminum as it is shown in FIG. 4B. From Table 1, it can be seen that the corrosion potential (Ecorr) increases from −0.777 V versus SCE for uncoated aluminum to −0.210 V versus SCE for aluminum coated by crosslinked PHFBMA Film. The corrosion current density (icorr) decreases from 2.50×10$^{-2}$ µA/cm$^2$ for uncoated aluminum to 4.45×10$^{-8}$ µA/cm$^2$ for aluminum coated by crosslinked PHFBMA Film. The polarization resistance (Rp), which is determined by using linear polarization resistance LPR, increases from 1.80×10$^3$ ohms/cm$^2$ for uncoated aluminum to 2.30×10$^9$ ohms/cm$^2$ for aluminum coated by crosslinked PHFBMA Film. Non-crosslinked PHFBMA film shows positive shift in the corrosion potential similar to that for crosslinked film, yet the corrosion current for the non-crosslinked film is much higher than the corrosion current for the crosslinked film indicating less corrosion protection for the non-crosslinked film than the crosslinked film, which exhibits an excellent corrosion protection. All electrochemical tests were done for 3 samples of crosslinked PHFBMA-coated aluminum.

Equation 1 was used to determine the corrosion protection efficiency (PE) using the measured corrosion current densities $i_{corr}$ for both the coated and uncoated surfaces:

$$\text{Protection efficiency (\%)} = \frac{i_{corr} - i_{corr(C)}}{i_{corr}} \times 100 \quad (1)$$

where, $i_{corr}$ and $i_{corr}$(C) are the corrosion current densities for uncoated and coated aluminum, respectively.

The polymer coated surface has a protection efficiency of 99.98%. Zheng et al. (Materials & Design, 2016, 93, 261) used a superhydrophobic coating on an aluminum surface. They reported a maximum value for PE of 99.75% and a maximum positive shift in the corrosion potential by 59 mV for the coated aluminum.

The insulation property of crosslinked PHFBMA Film was achieved by applying double coating of the fluorinated polymer on the aluminum substrate and doing potentiodynamic polarization test. No significant current flow was observed between the working and the counter electrode even the applied potential was increased from −0.16 to +0.08 V. The polarization resistance (Rp) for the crosslinked PHFBMA double coating increased to be 3.50×10$^{10}$ ohms/cm$^2$ compared to the Rp for the crosslinked PHFBMA single coating which is 2.30×10$^9$ ohms/cm$^2$.

Figure 5:
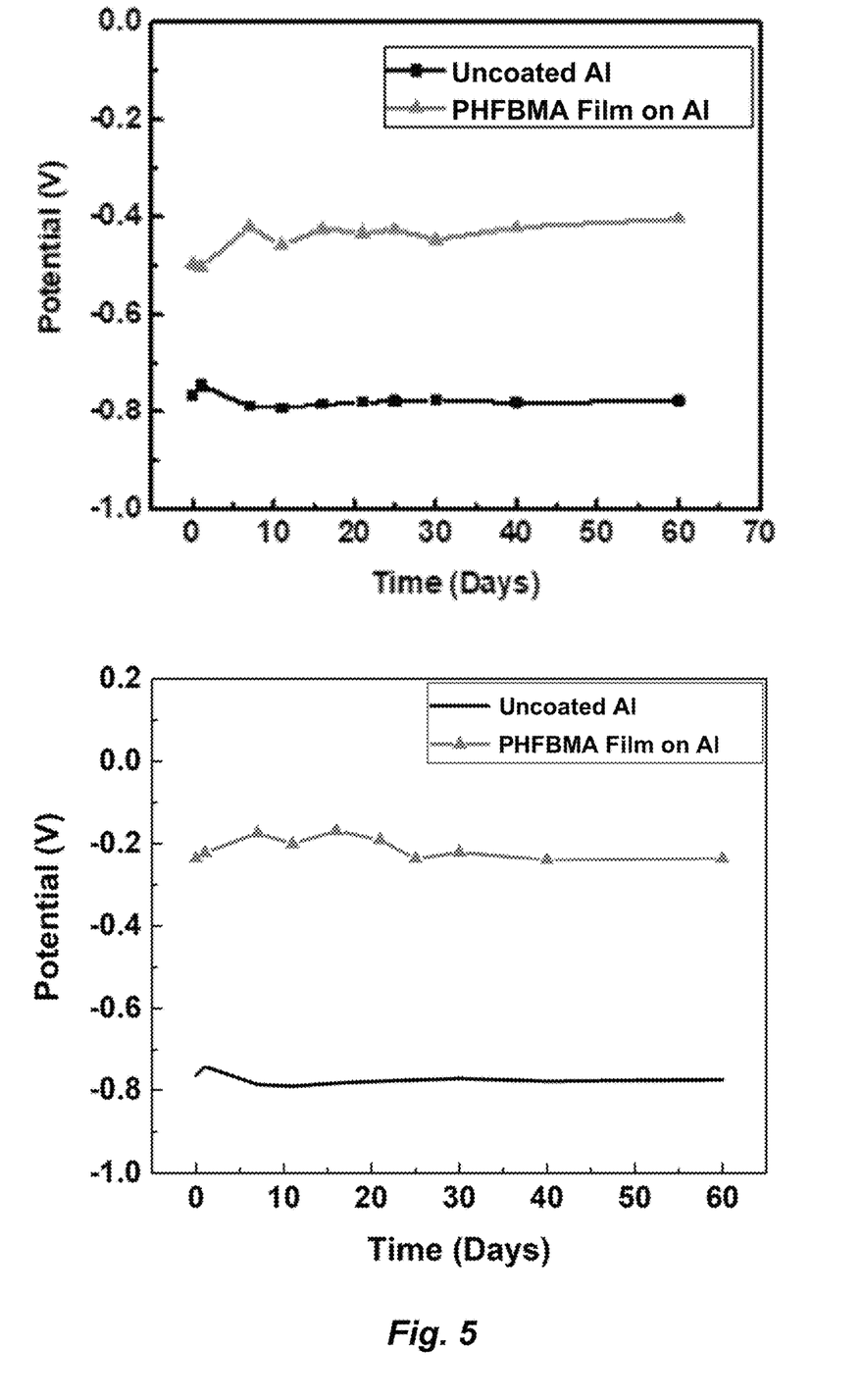
FIG. 5. OCP submersion studies in 3.5% NaCl.

FIG. 5A shows the open circuit potential (OCP) vs time for uncoated aluminum and PHFiPMA-coated aluminum. Over an extended period of 60 days during the OCP study, the aluminum sample coated by PHFiPMA film held a stable potential at a value of −0.5 V and higher, which matches the value of $E_{corr}$ for the coated sample, even in an aggressive medium of 3.5% NaCl, indicating that the PHFiPMA film is stable and acts as a protective layer on the aluminum surface during this period of time.

The results of open circuit potential vs time study for the uncoated aluminum sample and the aluminum coated by crosslinked PHFBMA film are represented in FIG. 5B. Even into a corrosive and aggressive medium of 3.5% NaCl, this polymeric coating shows stability and intactness over the period of 60 days during OCP immersion study. These results clearly show the stability of the potential values for the coated aluminum, −0.2 V, above the potential values of the uncoated aluminum, −0.8 V, confirming the stability and intactness of PHFBMA film on aluminum surface.

Overall, the results of $E_{corr}$, $i_{corr}$, $R_p$, OCP, and PE all indicate rather efficient corrosion protection and that the passivation of the cross-linked fluorinated polymer coating can protect the aluminum surface in a highly corrosive environment. This fluorinated coating may be useful for potential applications that required polymeric coatings that have a corrosion protection property with chemical and thermal stability.

TABLE 1

Electrochemical parameters for bare aluminum and aluminum coated with PHFiPMA and PHFBMA film.

| Samples | $E_{corr}$ (mV) | $i_{corr}$ (µA/cm$^2$) | $B_a$ (mV/dec) | $B_c$ (mV/dec) | Rp (Ω/cm$^2$) | PE (%) |
|---|---|---|---|---|---|---|
| Uncoated aluminum | −777 | 2.50 × 10$^{-2}$ | 229 | 191 | 1.80 × 10$^3$ | — |
| Aluminum coated by PHFiPMA Film | −510 ± 45 | 3.47 × 10$^{-6}$ ± 1.31 × 10$^{-7}$ | 389 ± 85 | 390 ± 76 | 2.42 × 10$^7$ ± 4.22 × 10$^6$ | 99.98 |
| Non-crosslinked PHFBMA Film on Al | −195 | 1.61 × 10$^{-4}$ | 592 | 585 | 7.90 × 10$^5$ | 99.35 |
| Crosslinked PHFBMA Film on Al | −210 ± 42 | 4.45 × 10$^{-8}$ ± 1.77 × 10$^{-8}$ | 409 ± 50 | 420 ± 40 | 2.30 × 10$^9$ ± 1.05 × 10$^9$ | 99.99 |

Conclusion. In this study, we have successfully synthesized the fluorinated polymer poly(hexafluoroisopropyl methacrylate) (i.e., PHFiPMA) and other fluoropolymers by using free-radical polymerization. FTIR spectroscopy confirms the disappearance of the C=C stretching frequency band from the monomer's spectrum as polymerization proceeds to make the polymer backbone after UV light exposure. By applying the hydrophobic polymer coating to the aluminum surface, the polarization resistance $R_p$ increased and the corrosion current density, $i_{corr}$, decreased, concomitant with a positive shift in the corrosion potential, $E_{corr}$, indicating enhanced corrosion protection of this fluorinated polymer coating. This coating also exhibits thermal stability as well as chemical resistance against harsh solutions and common solvents, allowing for use in a wide range of applications.

The following Example is intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLE

Example 1. Experiment and Procedures

Materials. Aluminum alloy (3003), which has the chemical composition shown in Table 1, was purchased from Metals Depot Co. The starting materials, which are the monomer (1,1,1,3,3,3-hexafluoroisopropyl methacrylate) (HFiPMA), (2,2,3,4,4,4-hexafluorobutyl methacrylate) (HFBMA), the photoinitiator (1-hydroxycyclohexyl phenyl ketone), and the cross-linker (PEG Diacrylate) were supplied by Sigma-Aldrich.

TABLE 2

| Chemical composition of Aluminum alloy 3003 (mass %) | | | | | |
| --- | --- | --- | --- | --- | --- |
| Al | Mn | Fe | Si | Cu | Zn |
| Bal. | 1.5 | 0.7 | 0.6 | 0.2 | 0.1 |

Fluorinated Polymer (PHFiPMA or PHFBMA) Synthesis by Photopolymerization. The ratio of polymerization starting materials, 90% monomer, 10% cross-linker, and 1% photoinitiator, was used to prepare the fluorinated polymer (PHFiPMA or PHFBMA). A homogeneous solution was prepared after dissolving the photoinitiator powder in the monomer and the cross-linker solution in a test tube. The solution was transferred to a small beaker by a pipet then mixed by a mechanical stirrer. UV light was used to produce the free radicals from the photoinitiator and start the polymerization process.

The polymerization conditions were room temperature, stirring by mechanical stirrer, and 2-15 minutes of exposure to UV light. After UV light exposure and stirring, a gel point was reached. The synthesis is shown in Scheme 1, which is similar to the fluoropolymer prepared from (2,2,3,4,4,4-hexafluorobutyl methacrylate) (HFBMA).

Scheme 1. Outline of synthesis of cross-linked poly(hexafluoroisopropyl methacrylate) (i.e., PHFiPMA).

Cross-Linking:

Cross-linked PHFiPM

Pretreatment of Aluminum Substrate. Squares of aluminum alloy (3003) substrate, 1 cm² each, were cut then polished by grit papers of different grades (400, 800, and 1200) to clean the surface and remove the oxide layer. The surface then was activated by 5% NaOH solution for 5 minutes followed by washing with distilled water then acetone.

Coating with the Fluorinated Polymer (PHFiPMA or PHFBMA). 0.2 mL of the polymer gel was applied onto 1 cm² squares of polished aluminum substrate by using the drop-casting method for coating. The polymer gel was cured on the surface by shining the UV light again for 2-15 minutes at room temperature. After curing, the polymer's solid-state was achieved with a film thickness of 21±7 μm (or 23±7 μm).

Characterization. To monitor the disappearance of the C=C double bond in the monomer, as shown in the polymerization mechanism (Scheme 1), Fourier-transform infrared spectroscopy (FT-IR) for the monomer and the prepared polymer was done using a Thermo Scientific Nicolet 6700 FT-IR instrument. Since the C—F bond is strong and stable, the resulting fluorinated polymer is expected to show thermal stability. Therefore, thermogravimetric analysis (TGA) was also carried out with a TGA Q50 V6.7 instrument to assess the thermal stability.

The low surface energy for the fluorinated polymer leads to an increase in hydrophobicity; therefore, dynamic contact angle, a quantitative test for the hydrophobicity, was carried out using an Infinity 2 Powerscope with GIMP software. The film thickness was determined using a Veeco Dektak 150 profilometer. To determine the chemical resistance and structure stability in a harsh medium, the polymer film was immersed into 5% $H_2SO_4$ solution at room temperature for 24 hours (and second in 5% NaOH for 24 hours at room temperature) then washed by distilled water and dried at about 80° C. The contact angle was then measured before and after immersion. Comparison of the contact angle before and after the immersion shows the effect of the acidic solution on the film surface. Common organic and inorganic solvents were used to determine the solubility for this fluorinated polymer.

Corrosion Testing. A Parstat 4000 instrument connected to a traditional three-electrode cell was used for electrochemical experiments and corrosion tests. A potentiodynamic polarization study was used to investigate the corrosion resistance of the PHFiPMA (or PHFBMA) film on aluminum alloy. Open circuit potential (OCP) vs time was performed to determine the stability of the PHFiPMA (or PHFBMA) film by immersing the coated and uncoated aluminum samples in a 3.5% NaCl solution for 60 days and comparing the measured potential. A range of −250 mV to +250 mV versus the open circuit potential (OCP) with a scan rate of 0.1666 mV/s were used for the potentiodynamic scans. All experiments were carried out in a 3.5% NaCl solution at room temperature. The working electrode was the uncoated or coated aluminum, reference electrode was the saturated calomel electrode (SCE), and the counter electrode was a platinum mesh. The working electrode (coated and uncoated aluminum) was immersed for 1800 seconds in the salt solution before each experiment to achieve a steady state open circuit potential (OCP).

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A corrosion resistant composition comprising a cross-linked haloalkyl-polymer of formula X:

wherein
$R^1$ and $R^2$ are terminal ends of the polymer;
$R^3$ and $R^4$ are branched or unbranched —$(C_1-C_6)$haloalkyl;
$R^5$ and $R^6$ are branched or unbranched —$(C_1-C_6)$alkyl; and
m and p are each independently at least 10;
wherein the ratio of the haloalkyl-monomer moiety and polyethyleneglycol-monomer (PEG-monomer) moiety is about 8:1 to about 10:1, and the crosslinked haloalkyl-polymer is bonded to the surface of an etched metal;
wherein the haloalkyl-monomer moiety is 1,1,1,3,3,3-hexafluoroisopropyl methacrylate (HFiPMA) or 2,2,3,4,4,4-hexafluorobutyl methacrylate (HFBMA); and
the PEG-monomer moiety is poly(ethyleneglycol diacrylate) wherein n is about 100 to about 100,000.

2. The composition of claim 1 wherein m and p are each independently about 100 to about 100,000.

3. The composition of claim 1 wherein the etched metal is aluminum alloy or steel.

4. The composition of claim 1 wherein the etched metal is aluminum alloy 3003 having a weight percent of 1.5% magnesium, 0.7% iron, 0.6% silicon, 0.2% copper, 0.1% zinc, and 96.9% aluminum.

5. The composition of claim 1 wherein the etched metal is an alkaline base or plasma etched metal.

6. A method for forming a corrosion resistant composition according to claim 1 comprising:
a) mixing the haloalkyl-monomer, polyethyleneglycol-monomer, and photoinitiator, wherein the mole ratio of the haloalkyl-monomer and the polyethyleneglycol-monomer is about 8:1 to about 10:1;
b) irradiating the mixture with a sufficient amount of UV light to form a gel;
c) applying the gel to the surface of an etched metal substrate; and
d) irradiating the applied gel with another sufficient amount of UV light to cure the gel wherein in the cured gel is a solidified crosslinked haloalkyl-polymer that has bonded to the etched metal substrate;
wherein the corrosion resistant composition is thereby formed.

7. The method of claim 6 wherein the etched metal substrate is aluminum alloy or steel.

8. The method of claim 6 wherein the etched metal substrate is aluminum alloy 3003 having a weight percent of 1.5% magnesium, 0.7% iron, 0.6% silicon, 0.2% copper, 0.1% zinc, and 96.9% aluminum.

9. The method of claim 6 further comprising etching a metal substrate with alkaline base or plasma to form the etched metal substrate wherein the etched metal substrate has an activated surface.

10. The method of claim 6 wherein the crosslinked haloalkyl-polymer has a thickness of about 1 micrometer to about 100 micrometers.

11. The method of claim 6 wherein the sufficient amount of UV light or the other sufficient amount of UV light is provided in about 1 minute to about 60 minutes.

12. The method of claim 6 wherein the crosslinked haloalkyl-polymer is a crosslinked haloalkyl-polymer of formula I or formula II:

or wherein
$R^1$ and $R^2$ are terminal ends of the polymer; and
m and p are each independently at least 10;
n is about 100 to about 100,000; and
the etched metal substrate is an aluminum alloy.

13. A corrosion resistant composition comprising a crosslinked fluoropolymer of formula I or formula II:

or wherein
$R^1$ and $R^2$ are terminal ends of the polymer;
m and p are each independently at least 10; and
n is about 100 to about 100,000;
wherein the ratio of the polyfluorinated monomer moiety and polyethyleneglycol-monomer moiety is about 8:1 to about 10:1, and the crosslinked fluoropolymer is bonded to the surface of an etched aluminum alloy.

14. The composition of claim 13 wherein the composition has a relative open circuit potential (OCP) value greater than or about equal to 0.3V higher than bare aluminum alloy after the composition and bare aluminum alloy have been immersed for 60 days in a 3.5 wt. % NaCl aqueous solution.

15. A corrosion resistant composition comprising a crosslinked haloalkyl-polymer of formula X:

wherein
- $R^1$ and $R^2$ are terminal ends of the polymer;
- $R^3$ and $R^4$ are branched or unbranched —$(C_1$-$C_6)$haloalkyl;
- $R^5$ and $R^6$ are branched or unbranched —$(C_1$-$C_6)$alkyl;
- m and p are each independently at least 10; and
- n is about 100 to about 100,000;
- wherein the ratio of the haloalkyl-monomer moiety and polyethyleneglycol-monomer (PEG-monomer) moiety is about 8:1 to about 10:1, and the crosslinked haloalkyl-polymer is bonded to the surface of an etched metal.

* * * * *